United States Patent
Sachdeva

(10) Patent No.: US 10,194,215 B2
(45) Date of Patent: Jan. 29, 2019

(54) METHOD AND SYSTEM FOR BROADCASTING AN ADVERTISEMENT TO A POTENTIAL CUSTOMER

(71) Applicant: MASTERCARD INTERNATIONAL INCORPORATED, Purchase, NY (US)

(72) Inventor: Harleen Kaur Sachdeva, Punjab (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/602,268

(22) Filed: May 23, 2017

(65) Prior Publication Data
US 2017/0347161 A1    Nov. 30, 2017

(30) Foreign Application Priority Data
May 26, 2016  (IN) .............................. 201641018149

(51) Int. Cl.
| | |
|---|---|
| *H04N 21/81* | (2011.01) |
| *G06Q 30/02* | (2012.01) |
| *H04N 21/45* | (2011.01) |
| *H04N 21/262* | (2011.01) |

(52) U.S. Cl.
CPC ....... *H04N 21/812* (2013.01); *G06Q 30/0249* (2013.01); *G06Q 30/0255* (2013.01); *G06Q 30/0261* (2013.01); *H04N 21/26241* (2013.01); *H04N 21/4532* (2013.01)

(58) Field of Classification Search
CPC .......... H04N 21/812; H04N 21/26241; H04N 21/4532; G06Q 30/0249; G06Q 30/0255; G06Q 30/0261
See application file for complete search history.

(56) References Cited

U.S. PATENT DOCUMENTS

| | | | | |
|---|---|---|---|---|
| 7,500,258 B1 * | 3/2009 | Eldering | ................ | H04N 7/165 725/134 |
| 9,832,246 B2 * | 11/2017 | LaJoie | .................. | H04L 65/601 |
| 9,865,017 B2 * | 1/2018 | Huber | ................ | G06Q 30/0269 |

\* cited by examiner

*Primary Examiner* — Hunter B Lonsberry
(74) *Attorney, Agent, or Firm* — Budzyn IP Law, LLC

(57) ABSTRACT

A system and method for broadcasting an advertisement of a product in a network is disclosed. The system includes a first interface unit for receiving transaction data of large number of customers from a financial service provider system, a second interface unit for receiving a viewership data from a network service provider system, a configuration database which stores a master rule, first and second sets of rules and a processing unit. The method includes (i) receiving the transaction data, (ii) processing the transaction data based on the first set of rule to obtain a potential customer base, (iii) receiving the viewership data, (iv) mapping the viewership data with the potential customer base to obtain an user database, (v) processing and aggregating the user database to obtain an optimal user database, and (vi) broadcasting the advertisement through the network service provider system in accordance to a second set of rule.

9 Claims, 6 Drawing Sheets

| | |
|---|---|
| Merchant: Porsche<br>Product: Car | Master Rule :<br>Stop broadcasting advertisement when the sales value reaches 1000million$ in last six months<br>First set of Rules:<br>(i) Customers who transacted with high-end restaurants OR jewellery seller AND<br>(ii) Customer who transacted only in last six months AND<br>(iii) Customer who transacted more than 1000$.<br>Second set of Rules:<br>(i) Target location 80061 AND<br>(ii) Target timestamp 8-10 PM |
| Merchant: Fly Emirates<br>Product : Vacation destinations | Master Rule :<br>Redefine the broadcasting of advertisement when the sales value below 350million$ in last six months in the zip code 80013<br>First set of Rules:<br>(i) Customers who transacted with travel and hospitality industry AND<br>(ii) Customer who transacted only in last one year AND<br>(iii) Location of the merchant is in the zip code of 80013<br>Second set of Rules:<br>(i) Target TV channel is BBC & CNBC<br>(ii) Target timestamp 8-10 PM<br>(iii) Broadcast advertisement three times in the timestamp 8-10PM when the user count is above 50 or broadcast one time |

| | 302 | 304 | 306 | 308 | 310 | 312 | 314 | 316 |
|---|---|---|---|---|---|---|---|---|
| | Card Number (Hashed) | Txn Date | State | Zip code | Industry Name | Seller Name | Txn Count | Txn Amount |
| | ACGBKTY1234 | 17-Jan-15 | CO | 80013 | Jewellery and Giftware | Tiffany & Co. | 1 | 8494 |
| | ACGBKTY1243 | 26-Jan-15 | CO | 80013 | Eating Places | Opa Grill | 5 | 424 |
| | ACGBKTY1247 | 26-Jan-15 | CO | 80013 | Eating Places | Café Monet | 1 | 481 |
| | ACGBKTY1251 | 17-Jan-15 | MA | 82654 | Jewellery and Giftware | Tiffany & Co. | 5 | 8949 |
| | ACGBKTY1261 | 24-Jan-15 | CO | 80013 | Jewellery and Giftware | Tiffany & Co. | 1 | 5530 |
| | ACGBKTY1262 | 6-Jan-15 | CO | 80013 | Eating Places | Opa Grill | 6 | 407 |
| | ACGBKTY1568 | 15-Jan-15 | CA | 80016 | Entertainment | Theater | 1 | 8954 |
| | ACGBKTY1593 | 21-Jan-15 | NY | 81641 | High end restaurants | FOGO DE CHAO | 1 | 743 |
| | ACGBKTY1594 | 20-Jan-15 | NY | 81641 | High end restaurants | FOGO DE CHAO | 7 | 681 |
| | ACGBKTY5944 | 20-Jan-15 | MA | 82654 | Entertainment | Parks | 5 | 986 |
| | ACGBKTY1595 | 26-Jan-15 | NY | 81641 | Jewellery and Giftware | Tiffany & Co. | 1 | 12308 |
| | ACGBKTY5945 | 20-Jan-15 | MA | 82654 | Travel | Airways | 5 | 5869 |
| | ACGBKTY5945 | 20-Jan-15 | CA | 80016 | Hospitality | Park Hyatt | 5 | 7856 |
| | ⋮ | ⋮ | ⋮ | ⋮ | ⋮ | ⋮ | ⋮ | ⋮ |
| | ACGBKTY1596 | 4-Jan-15 | NY | 81641 | Jewelry and Giftware | Tiffany & Co. | 2 | 4495 |
| | ACGBKTY1672 | 16-Jan-15 | NY | 81641 | Eating Places | Café deMarie | 1 | 689 |

| Card Number (Hashed) | Txn Date | State | Zip code | Industry Name | Seller Name | Txn Count | Txn Amount |
|---|---|---|---|---|---|---|---|
| ACGBKTY1234 | 17-Jan-15 | CO | 80013 | Jewellery and Giftware | Tiffany & Co. | 1 | 8494 |
| ACGBKTY1593 | 21-Jan-15 | NY | 81641 | High end restaurants | FOGO DE CHAO | 1 | 743 |
| ACGBKTY1594 | 20-Jan-15 | NY | 81642 | High end restaurants | FOGO DE CHAO | 7 | 681 |
| ACGBKTY1595 | 26-Jan-15 | NY | 81641 | Jewellery and Giftware | Tiffany & Co. | 1 | 12308 |
| ⋮ | ⋮ | ⋮ | ⋮ | ⋮ | ⋮ | ⋮ | ⋮ |
| ACGBKTY1596 | 4-Jan-15 | NY | 81643 | Jewelry and Giftware | Tiffany & Co. | 2 | 4495 |

FIGURE 4

| Dummy Subscriber Id | Channel | Timestamp start | Timestamp end | Financial Card Number (hashed) |
|---|---|---|---|---|
| Aaabbbccc | CNBC | 1/21/15 10:30 PM | 1/21/15 11:30 PM | ACGBKTY1234 |
| Aaabbbccc | FOX | 1/10/15 12:23 PM | 1/10/15 1:23 PM | ACGBKTY1243 |
| Bbbcccddd | CNN | 1/28/15 6:17 AM | 1/28/15 7:17 AM | ACGBKTY1596 |
| Zzzzzzzzss | CBS | 1/17/15 6:26 PM | 1/17/15 7:26 PM | ACGBKTY1251 |
| Aaabbbccc | NBC | 1/29/15 8:59 PM | 1/29/15 9:59 PM | ACGBKTY1261 |
| Aaabbbccc | Sony | 1/1/15 5:59 PM | 1/1/15 6:59 PM | ACGBKTY1262 |
| Bbbcccddd | Zee | 1/31/15 6:15 AM | 1/31/15 7:15 AM | ACGBKTY1247 |
| ⋮ | ⋮ | ⋮ | ⋮ | ⋮ |
| Zcsadfa | Sony | 1/28/15 6:17 AM | 1/28/15 7:17 AM | ACGBKTY1672 |

FIGURE 5

METHOD AND SYSTEM FOR BROADCASTING AN ADVERTISEMENT TO A POTENTIAL CUSTOMER

FIELD OF INVENTION

The present invention relates to a system and method for broadcasting an advertisement to a potential customer and more particularly relates to a system and method for broadcasting the advertisement in an effective time slot through an effective medium at a particular location where the potential customers are concentrated.

BACKGROUND OF THE INVENTION

Merchants or manufacturers require a return on the financial resources they spend on advertising products and services. There are a large number of merchants who do not have budget to advertise nationally, due to expensive advertisement slots allotted by the network service provider (such as Television networks, websites and social networks). One way to increase the effectiveness and control the cost of advertising is to deliver advertisements that are relevant (targeted) to specific classes of subscriber. In order to deliver targeted advertisements, traits, characteristics and interests of the subscribers need to be identified. Numerous methods have been proposed for gathering and processing data about subscribers based on their viewing, purchasing and surfing (Internet) transactions. But none of these provides a complete picture of subscriber purchasing behaviour.

In addition, privacy has become one of the most salient concerns of consumers and governments since the arrival of the Internet. There is sensitivity to the potential for privacy to be compromised by modern technology, including marketing and advertising systems that acquire personally identifiable information about consumers. Accordingly, the ways in which advertising data and consumer information are collected, processed and analyzed must address the need for consumer privacy.

Accordingly there is a need to provide a solution to one or more of above said problems. The present invention solves one or more of these problems in a unique and economical manner.

SUMMARY OF THE INVENTION

In one aspect of the present embodiment, a system and a method are designed to enable merchants to manage their TV advertisement budget more efficiently and at the same time reach out to the potential customers. The system, in certain embodiments, is designed to target advertisements to geographical areas where the potential customer base for a business is concentrated at time slots and channels most preferred by the potential customers. A geographical area may be defined at different levels such as country, state, city, zip code etc. The system first calculates a potential customer base of a business, then calculates the preferred time slots/channels and days of high viewership for those customers. It then aggregates the data at zip-code or higher geographical area to identify geographical concentrations where advertisements will be most effective. It then calculates the efficacy of the advertisement based upon sales volumes and feeds the input back to recalculate the potential customer base. The system identifies the potential customer base for merchants, based upon users' spending habits using transactions data. The viewership data from television service provider is obtained and processed to identify the most preferred timeslots, channels and days when users watch Television. It then maps both the potential customer base with the viewership data to get the most preferred time slots/channels/days for potential customers, aggregated at zip code level or higher. Merchants then place relevant advertisements on these time slots for targeted advertisements.

Further, embodiments of the present system and method use the changes in regional/geographical area based sales numbers to predict the efficacy of the advertisement aired in that geographical area. The system is also designed to use actual sales data in a particular geography rather than merely speculating as to the efficacy of the advertisement based upon views by subscribers. Based upon the success rate in a geographical area, the advertisement may be re-run or changed or withdrawn from that particular area. It may also be taken as an input to re-calculate the potential customer base. For example, if it is a big ticket purchase such as a house or a car, the potential customer base may reduce after the purchase. On the other hand, if it is a product with a shorter buying cycle, such as a breakfast cereal, the advertisements would continue to increase stickiness. This would also help the businesses/merchants calculate the number of advertisements repeats to air, based upon their ROI (Return On Investment).

In another aspect of the present embodiment, a method for broadcasting an advertisement of a product over a network is provided. The method includes steps of (i) receiving transaction data of large number of customers from a financial service provider system, the transaction data includes a hashed reference generated by the financial service provider system, a payment information, location, a purchase information and amount of transaction, (ii) processing the transaction data of the large number of customers based on first set of rules to obtain a potential customer base, (iii) receiving viewership data of the large number of customers from a network service provider system, the viewership data includes a communications channel along with a timestamp associated to the communications channel and payment information of the large number of customers, and the payment information includes the hashed reference, (v) mapping the viewership data with the potential customer base to obtain an user database, the user database includes the communications channel along with the timestamp and the location, (vi) processing and aggregating the user database to obtain an optimal user database, the optimal user database includes the communications channel, an optimal timestamp associated to the communications channel, user counts and the location, and (v) broadcasting the advertisement through the network service provider system in the communications channel and at the optimal timestamp in accordance to second set of rules. The method further includes (a) identifying a sales data relating to the product by processing the transaction data for a predefined time interval, (b) obtaining the potential customer base again when the sales data deviates from a threshold range based on a master rule, (c) receiving the viewership data from the network service provider system, (d) mapping the viewership data with the potential customer base to obtain the user database, (e) processing and aggregating the user database to obtain the optimal user database, and (f) broadcasting the advertisement through the network service provider system in the communications channel and at the optimal timestamp in accordance to the second set of rules. The first set of rules includes at least one of (1) processing the transaction data based on the purchase information, (2) processing the transaction data based on the location, and (3) processing the transaction data based on the amount of transaction. The second set of rules includes at least one of (A) broadcasting advertisement in a particular location, (B) broadcasting advertisement in a particular communications channel, (C) broadcasting advertisement in a particular timestamp; and (D) broadcasting advertisement when the user counts above a threshold. The method further determines a frequency of the advertisement in the optimal timestamp based on the user counts.

In yet another aspect of the embodiment, a system for broadcasting an advertisement of a product in a network is provided. The system includes (i) a first interface unit for receiving transaction data of large number of customers from a financial service provider system, the transaction data includes a hashed reference generated by the payment service provider system, payment information, a location, purchase information and amount of transaction, (ii) a second interface unit for receiving a viewership data from a network service provider system, the viewership data includes a communications channel along with a timestamp associated to the communications channel and payment information of large number of customers, the payment information includes the hashed reference, (iii) a configuration database which stores a master rule, first set of rules and second set of rules, and (iv) a processing unit. The processing unit is adapted for (a) processing the transaction data by the first set of rules to obtain a potential customer base, (b) mapping the viewership data with the potential customer base to obtain a user database for the advertisement, the user database includes the communications channel along with the timestamp and the location, (c) processing and aggregating the user database obtain an optimal user database, the optimal user database includes the communications channel, an optimal timestamp associated to the communications channel, user counts and the location, and (d) broadcasting the advertisement through the network service provider system in the communications channel and at the optimal timestamp according to the second set of rules. The network is television network.

BRIEF DESCRIPTION OF THE ACCOMPANYING DRAWINGS

The advantages and features of embodiments of the invention will become more clearly apparent from the following description which refers to the accompanying drawings given as non-restrictive examples only and in which:

FIG. 2 illustrates the configuration database of the system as shown in FIG. 1 in accordance with an embodiment herein;

FIG. 3 illustrates a table containing transaction data of a large number of customers according to an embodiment herein;

FIG. 4 illustrates a potential customer base obtained from the transaction data as illustrated in FIG. 3 in accordance with an embodiment herein;

FIG. 5 illustrates a table containing viewership data of a large number of customers obtained from a network service provider system of FIG. 1 according to an embodiment herein;

DETAILED DESCRIPTION OF THE INVENTION

Embodiments of the present invention will be described with reference to the accompanying drawings. A system and method for broadcasting advertisement in a network is described herein.

The following description is an exemplary embodiment of the invention only, and is not intended to limit the scope, applicability or configuration of the invention. Rather, the following description is intended to provide a convenient illustration for implementing various embodiments of the invention. As will become apparent, various changes may be made in the function and arrangement of the structural/operational features described in these embodiments without departing from the scope of the invention. It should be appreciated that aspects of the present description may be adapted to be employed with alternatively configured devices or operations while still falling within the scope of the present invention. Thus the detailed description herein is presented for purposes of illustration only and not of limitation.

Figure 1:
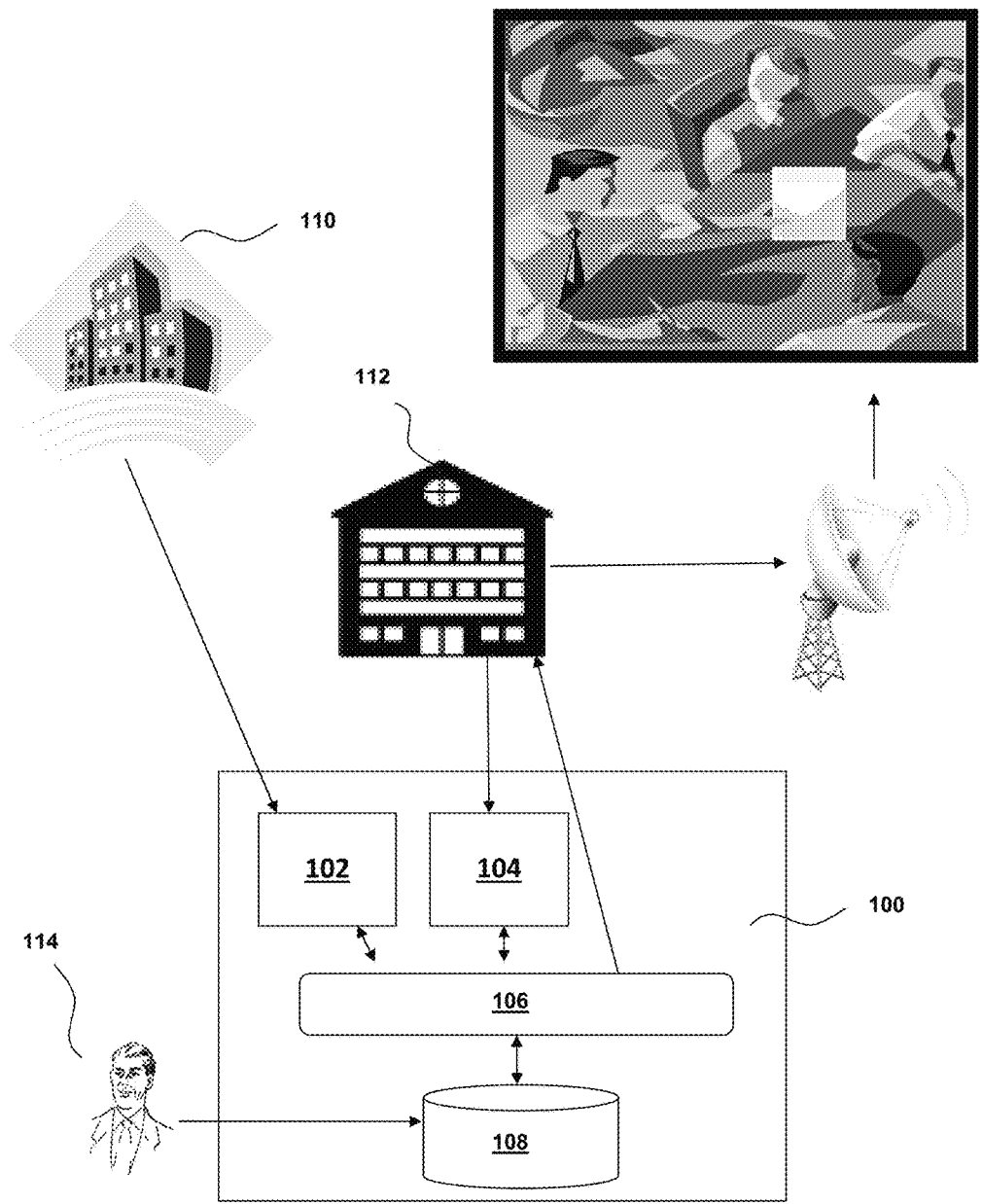
FIG. 1 illustrates a high level block diagram of a system for broadcasting an advertisement of a product in a network in accordance with an embodiment herein.

FIG. 1 illustrates a high level block diagram 100 of a system for broadcasting an advertisement of a product in a network in accordance with an embodiment herein. The system 100 includes a first interface unit 102, a second interface unit 104, a processing unit 106 and a configuration database 108. The first interface unit 102 receives transaction data of large number of customers from a financial service provider system 110. The transaction data includes but not limited to a hashed reference generated by the financial service provider system 110 for each customer (and hence the customer's personal data is kept confidential in the financial service provider system), a payment information, location of the seller, purchase information and amount of transaction. The second interface unit 104 receives viewership data from a network service provider system 112. For illustrative purposes, the network service provider system 112 is illustrated as being associated with a television network service provider system. However, the network service provider system 112 may include (without being limited to) an internet network service provider system, a telephone network provider system, etc. The viewership data includes, without limitation, a communications channel, a timestamp associated to the communications channel and payment information of the large number of customers. The payment information includes the hashed reference. The configuration database 108 stores one or more rules which includes but not limited to a master rule, first set of rules and second set of rules for each product of the one or more merchants. The one or more rules in the configuration database 108 are described according to requirement of the merchant for effective airing of the advertisement. The processing unit 106 process the transaction data and the viewership data received in the first interface unit 102 as well as second interface unit 104 and instruct the network service provider system 112 for broadcasting the advertisement of the product based on one or more rules stored in the configuration database 108. The product may be but is not limited to being a physical product (such as vehicle, stationery, edible items, grocery items etc.), services (such as support services, Back office services etc.) and offers.

As used herein, a "communications channel" is any medium via which a network service provider system transmits content to a consumer. For example, if the network service provider system is associated with a television network, then a communications channel may be one of a plurality of viewing channels (for example, a cable or satellite TV channel). If the network service provider system is associated with an internet service provider, then a communications channel may be a webpage, a streaming audio or video channel, etc.

FIG. 2 illustrates the configuration database 108 of the system 100 as shown in FIG. 1 in accordance with an embodiment herein. For illustrative purposes, the configuration database 108 is provided only for two merchants, such as Porsche and Emirates. FIG. 3 illustrates a table containing transaction data 300 of large number of customers obtained from the financial service provider system 110 of FIG. 1 according to the process described above. The financial service provider system 110 provides the transaction data 300 which includes the hashed reference 302, transaction information (304, 314, 316), purchase information (310, 312) and location of the seller (306, 308). The transaction information includes transaction date 304, transaction count 314 and transaction amount 316. The purchase information includes, but is not limited to, industry name or industry type 310 (categorized and stored in the financial service provider system), and merchant name 312. The location includes state 306 and the zip-code 308 of the seller. The transaction data 300 is processed based on the first set of rules of the configuration database 108 to obtain a potential customer base. The first set of rules is defined by the merchant based on his/her product which is to be advertised.

FIG. 4 illustrates a potential customer base 400 obtained from the transaction data 300 as illustrated in FIG. 3. For example, consider a high end car manufacturer (merchant of the advertisement)—say Porsche wants to advertise their product in the network through the network service provider system 112. The first set of rules for a particular merchant (Porsche) which is defined based on the purchase behaviour of the customer and this could include the following Rule (i) customers who transacted with a jewellery store (say Tiffany & Co.) or dining at high end restaurants (this rule is processed by applying a filter to the seller name 312 for Porsche and applying filter to the industry type 310 as "high end restaurant") and Rule (ii) customers who transacted in an amount more than $1000 (this rule is processed by applying a filter to the transaction amount 316 in the table 300).

In another example, the merchant of the advertisement is an airline such as Emirates who wants to advertise their offers for a particular vacation destination. The first set of rules for the particular merchant (Emirates) could include the following Rule (i) customers who transacted within a particular time frame (e.g. the last year) (this rule is processed by applying a filter to the transaction date 304 of the table 300), Rule (ii) customers who transacted with at least two sellers, where the locations between the sellers are greater than 500 miles (this rule is processed by a applying filter to the seller state 306 and zip code 308, and additional information relating to zip code geolocations—which may be stored in configuration database 108, another database, or retrieved from a remote server storing such data—as well as hashed reference 302 of the table 300) and Rule (iii) customers who transacted with sellers who are in the travel or hospitality industry (this rule is processed by applying a filter to the industry type 310 of the table 300).

FIG. 5 illustrates a table containing viewership data 500 of large number of customers obtained from the network service provider 112 of FIG. 1. The viewership data 500 includes a dummy subscriber ID 502, a communications channel 504 (TV channel in case of television service provider, a webpage in case the service provider is internet service provider) associated to the dummy subscriber ID, a timestamp 506A-B (which includes timestamp start and timestamp end) associated to the communications channel 504 and payment information 508 associated to the dummy subscriber ID 502. The payment information 508 which is stored at the network service provider system 112 at the time of the subscriber making payment for the subscription is associated with the dummy subscriber ID 502. The payment information 508 includes the hashed reference which is generated by the financial service provider system 110. In another embodiment, if the network service provider system 112 has not provides the dummy subscriber ID 502, then the viewership data 500 may include the communications channel 504, timestamp 506A-B and the payment information 508.

Figure 6:
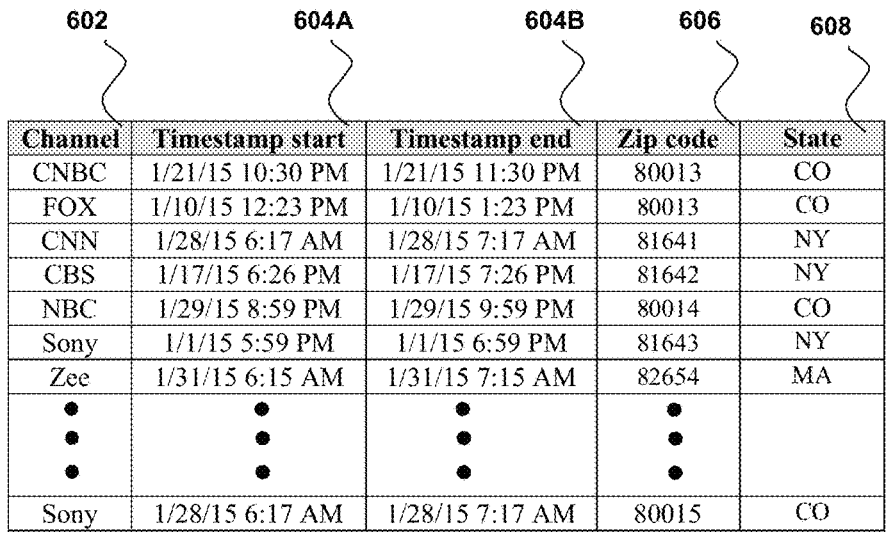
FIG. 6 illustrates a user database obtained after mapping the potential customer base as shown in FIG. 4 with the viewership data of FIG. 5 in accordance with an embodiment herein.

The potential customer base 400 as shown in FIG. 4 is mapped with the viewership data 500 as shown in FIG. 5 to obtain a user database 600 as shown in FIG. 6. FIG. 6 illustrates the user database 600 obtained after mapping the potential customer base 400 with the viewership data 500 of FIG. 5 in accordance to the embodiment herein. The potential customer base 400 is mapped with the viewership data 500 based on the hashed reference 402 & 508. The user database 600 as illustrated in FIG. 6 includes a communications channel 602, the timestamp 604A-B associated to the communications channel and the location 606-608.

Figure 7:
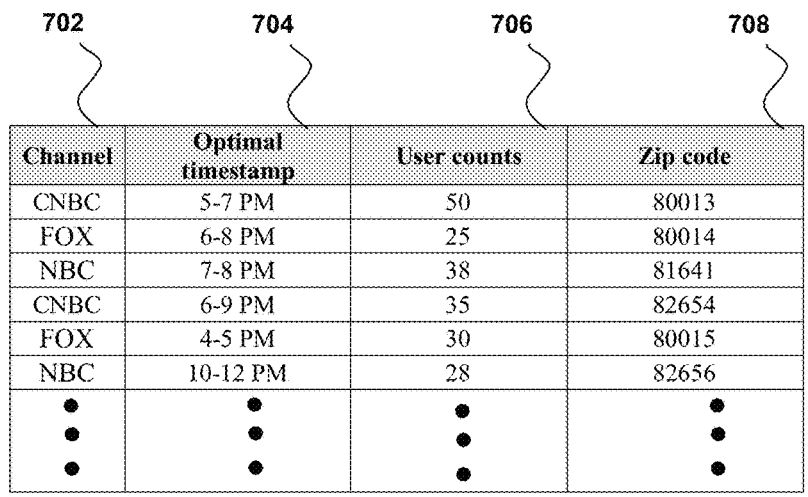
FIG. 7 illustrates an optimal user database consolidated based on a location in accordance with an embodiment herein.
Figure 8:
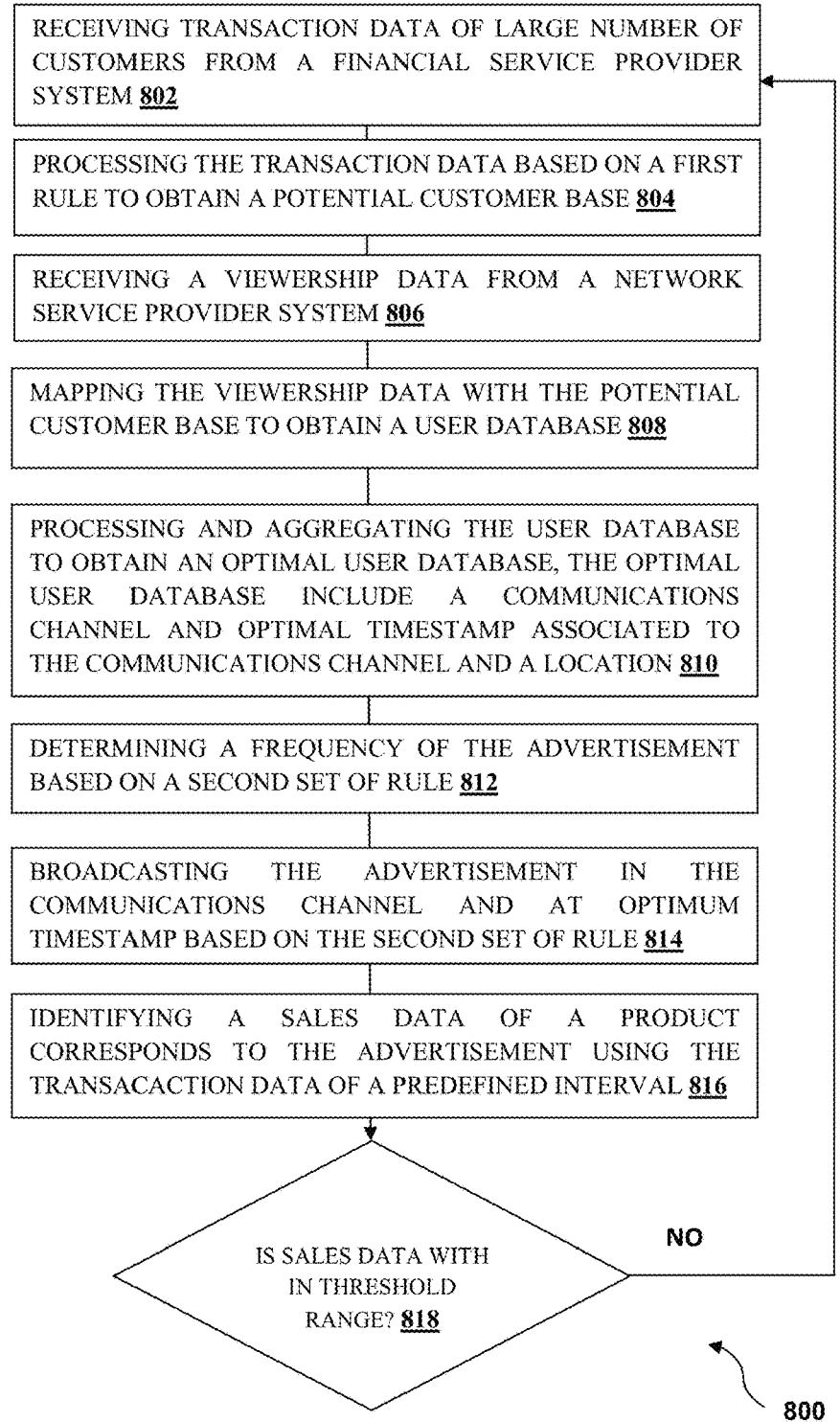
FIG. 8 illustrates a flow diagram for a method of broadcasting an advertisement of a product in a network according to an embodiment herein.

The user database 600 is aggregated and processed based on the timestamp 604 to obtain an optimal user database 700 as shown in FIG. 7. FIG. 7 illustrates the optimal user database 700 after processing and aggregating the user database 600 as shown in FIG. 6 in accordance to the embodiment herein. The optimal user database 700 includes the communications channel 702, an optimal timestamp 704 associated to the communications channel, user counts 706 in each optimal timestamp 704 and the location 708. Here, the timestamp start 604A data and timestamp end 604B data from the user database 600 is processed to obtain the optimal timestamp 704. For example, consider the timestamp start data is 1/21/15 10:30 PM and timestamp end data is 1/21/15 11:30 PM and after processing these data the optimal timestamp data would be 10:30-11:30 PM. After obtaining the optimal timestamp data 704, the user database 600 is aggregated by grouping all communications channel at each of the particular optimal timestamp intervals. For example, if five rows of user database 600 (after obtaining the optimal timestamp) represents that BBC channel is viewed at the optimal timestamp of 10:30-11:30 PM at the zip code location of 80013, then those data are grouped i.e. aggregated and represented as a single row in the optimal user database 700 as BBC (communications channel), 10:30-11-30 PM (optimal timestamp), 5 (user counts) and 80013 (Location).

After obtaining the optimal user database 700, the processing unit 106 broadcasts the advertisement based on the second set of rules defined in the configuration database 108. The second set of rules is defined by the merchant of the advertisement in the configuration database 108. Based on the second set of rules, the processing unit 106 determines at which particular location, at which optimal timestamp and at which communications channel the advertisement need to be broadcasted. The second set of rules includes one rule or combination of two or more rules. The second set of rules includes, but is not limited to, rule (i) broadcast advertisement when user counts above threshold, (ii) broadcast advertisement based on particular time interval, (iii) broadcast advertisement based on particular communications channel, (iv) broadcast advertisement in particular location and (v) broadcast advertisement at specified frequency. The second set of rules can be a single rule or any combinations of rules (i), (ii), (iii), (vi) and (v). For example, the merchant can define the following rules (a) broadcast advertisement at all optimal timestamp when user counts above 100 (this rule would broadcasts the advertisement in all optimal timestamp at the corresponding communications channel based on the optimal user database 700 irrespective the location), (b) broadcast advertisement at all timestamp in the particular location 80013 (this rule would broadcasts the advertisement in the particular location 80013 in all of the optimal timestamp at the corresponding communications channel based on the optimal user database 700 irrespective of the user counts), (c) broadcast advertisement in the BBC, CNBC only, (d) broadcast advertisement at optimal stamp between 6 PM-8 PM only (this rule would broadcast advertisement at optimal timestamp 6 PM-8 PM based on the optimal user database 700, the system intelligently analyse the optimal user database and broadcast advertisement accordingly. Consider, the optimal user database as shown below

| Channel | Optimal timestamp | User counts | Zip code |
| --- | --- | --- | --- |
| CNBC | 5.30-6.30 PM | 50 | 80013 |
| FOX | 6-8.30 PM | 25 | 80014 |

For the above optimal user database 700 and for the above rule (d), the system would broadcast the advertisement between 6-6.30 PM on CNBC as well as on FOX at zip codes 80013 & 80014 & between 6.30-8 PM only on FOX at zip code 80014

(e) broadcast advertisement at particular location (e.g. 80013) in a particular optimal timestamp (e.g. 6-8 PM), (f) broadcast advertisement at particular optimal stamp (e.g. 6-8 PM), at particular communications channel (BBC, CNBC) and when user counts above 30, (g) broadcast advertisement at particular optimal stamp (e.g. 6-8 PM), at particular communications channel (BBC, CNBC) and at every break interval allocated by the network (i.e. television) service provider system, and (f) broadcast advertisement at particular optimal stamp (e.g. 6-8 PM), at particular communications channel (BBC, CNBC) and at once in three break interval allocated by the network (i.e. television) service provider system when a sales data of the product falls between a first threshold range (11 million$ to 13 millon$). Here, the system obtains the sales data from the processing unit. The processing unit 106 continuously analyses the transaction data for a particular time period to identify the sales data of the product. In another embodiment, the sale data can be inputted to the system 100 by the merchant 114.

The present system 100, in certain embodiments, continuously monitors the sales data of the products of the merchant and reformulates the optimal user database 700 based on the sales data. For example, the master rule in the configuration database is defined as (i) automatically reschedule the broadcasting of the advertisement when the sales value of the product above $10,000 and below $20,000, (ii) stop broadcasting the advertisement when the sales value of the product above $20,000. The present system obtains the sales value automatically by analysing the transaction data of the large number of customers at a particular time interval (say for example, for the last three months). In another embodiment, the sales value of the product will be inputted by the merchant to the system.

In yet another embodiment, the present system analyses the purchase history of actual buyers of the product and identifies the similarities in purchases of different products by these buyers. The system then uses this information to identify transactions with similar purchases, but who are not the actual buyers, to get another set of potential customers. For example, consider the customers A, B and D purchases the product 'Porsche'. By analysing the transaction data of customers A, B and D, the system would obtain additional purchase behaviour of the relevant customers. For example, the customers A, B & D spends more in travel industry apart from the jewellery and high-end restaurant. Hence, the system suggests the additional purchase behaviour for the first set of rules of the configuration database. The system may use various machine learning and data mining techniques to identify such transactions.

The present system and method facilitates to target advertisements to areas where the potential customer base for a business are concentrated at time slots and channels most preferred by the potential customers. The present system and method first calculates the potential customer base of a business, then calculates the preferred time slots/channels and days of high viewership for those customers. It then aggregates the data at zip-code or higher geographical area to identify geographical concentrations where advertisements will be most effective. It then calculates the efficacy of the advertisement based upon sales volumes and feeds the input back to recalculate the potential customer base. The system uses the actual sales volume number to calculate trend for the regions where advertisement was aired. It also determines the correlation between the advertisement money spent by the merchant and actual sales at the region, to derive the efficacy of the advertisement budget spend. This would again help merchants optimize the areas/timeslots/days of airing their advertisements. Based upon the success rate in a geographical area, the advertisement may be re-run or changed or withdrawn from that particular area. It will also be taken as an input to re-calculate the potential customer base. For example, if it is a big ticket purchase such as a house or a car, the potential customer base may reduce after the purchase. On the other hand, if it a product with smaller buying cycle, such as breakfast cereals, the advertisements would continue to increase stickiness. This would also help the businesses/merchants calculate the number of advertisements repeats to air, based upon their ROI (Return On Investment). The system will thus enabling the merchants to pick their advertisement slots more effectively, and narrowed to smaller geographies. The system will help merchants manage their advertisement budgets more efficiently. It will specially be beneficial for smaller and new merchants, for whom national broadcasting is expensive.

Embodiments of the present invention also relate to the system for performing the operations herein. This system may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

I claim:

1. A computer-implemented method for broadcasting an advertisement for a merchant of a product over a network comprising the steps of:
   receiving transaction data relating to a plurality of customers from a financial service provider system, wherein said transaction data comprises, for each transaction, a hashed reference generated by said financial service provider system to anonymously reference the related customer, payment information, location, purchase information and amount of transaction;
   receiving a first set of rules defined by the merchant based on the product, the first set of rules defining parameters for identifying customers from said plurality of customers as potential customers of the product based on the transaction data;
   processing said transaction data of said plurality of customers based on at least one rule from the first set of rules to obtain a potential customer base;
   receiving viewership data of said plurality of customers from a network service provider system, wherein said viewership data comprises a listing of communications channels along with timestamp starts and timestamp ends associated with respective said communications channels and payment information of said plurality of customers, said payment information being taken from stored subscription records and having associated therewith said hashed references;
   mapping said viewership data with said potential customer base, utilizing said hashed references, to obtain an user database, wherein said user database comprises at least one entry of said communications channel associated with respective said timestamp start, said timestamp end, and said location;
   for each said communications channel, determining optimal timestamps based on the timestamp starts and the timestamp ends, each of the the optimal timestamps representing a range of time;
   aggregating, based on the optimal timestamps, user counts for each said communications channel for each said location;
   selecting, based on said aggregated user counts, at least one associated grouping of said communications channels, said optimal timestamps, and said locations in accordance with at least one rule from a second set of rules;
   broadcasting said advertisement for the product through said network in said at least one selected communications channel for said at least one selected location within the range of time of said at least one selected optimal timestamp;
   monitoring transaction data relating to said plurality of customers generated after the broadcasting of the advertisement of the product to identify sales of the product to said plurality of customers; and,
   determining further broadcasting of the advertisement of the product based on the identified sales of the product.

2. The computer-implemented method of claim 1, further comprising:
   identifying sales data relating to said product by monitoring said transaction data for a predefined time interval;
   obtaining said potential customer base again when said identified sales data deviates from a threshold range based on a master rule;
   receiving said viewership data from said network service provider system;
   mapping said viewership data with said potential customer base to obtain said user database;
   processing and aggregating said user database to obtain said optimal user database; and
   broadcasting said advertisement through said network service provider system in said communications channel and at said optimal timestamp in accordance to at least one rule from said second set of rules.

3. The computer-implemented method of claim 1, wherein said first set of rules comprises at least one of
   processing said transaction data based on said purchase information;
   processing said transaction data based on said location; and
   processing said transaction data based on said amount of transaction.

4. The computer-implemented method of claim 1, wherein said second set of rules comprises at least one of
   broadcasting advertisement in a particular location;
   broadcasting advertisement in a particular communications channel;
   broadcasting advertisement in a particular timestamp; and broadcasting advertisement when said user counts above a threshold.

5. The computer-implemented method of claim 1, further comprising
determining a frequency of said advertisement in said optimal timestamp based on said user counts.

6. The computer-implemented method of claim 1, wherein said network is television network.

7. A system for broadcasting an advertisement for a merchant of a product over a network, said system comprising:
 a first interface unit for receiving transaction data of a plurality of customers from a financial service provider system, wherein said transaction data comprises for each transaction, a hashed reference generated by said financial service provider system to anonymously reference the related customer, payment information, location, purchase information and amount of transaction;
 a second interface unit for receiving a viewership data from a network service provider system, wherein said viewership data comprises a listing of communications channels along with timestamp starts and timestamp ends associated with respective said communications channels and payment information of said plurality of customers, said payment information being taken from stored subscription records and having associated therewith said hashed references;
 a configuration database which stores a master rule, a first set of rules and a second set of rules, wherein the first set of rules is defined by the merchant and includes parameters for identifying customers from said plurality of customers as potential customers of the product based on the transaction data; and
 a processing unit is adapted for
  (i) processing said transaction data by at least one of said first set of rules to obtain a potential customer base;
  (ii) mapping said viewership data with said potential customer base, utilizing said hashed references, to obtain a user database for said advertisement, wherein said user database comprises at least one entry of said communications channel associated with respective said timestamp start, said timestamp end, and said location,
  (iii) for each said communications channel, determining optimal timestamps based on the timestamp starts and timestamp ends, each of the optimal timestamps representing a range of time;
  (iv) aggregating, based on said optimal timestamps, user counts for each said communications channel for each said location;
  (v) selecting, based on said aggregated user counts, at least one associated grouping of said communications channels, said optimal timestamps, and said locations in accordance with at least one rule from a second set of rules;
  (vi) broadcasting said advertisement for the product through said network in said at least one selected communications channel for said at least one selected location within the range of time of said at least one selected optimal timestamp;
  (vii) monitoring transaction data relating to said plurality of customers generated after the broadcasting of the advertisement of the product to identify sales of the product to said plurality of customers; and,
  (viii) determining further broadcasting of the advertisement of the product based on the identified sales of the product.

8. The system of claim 7, wherein said processing unit is further adapted for
 identifying sales data relating to said product by monitoring said transaction data for a predefined time interval;
 obtaining said potential customer base again when said identified sales data deviates from a threshold range based on said master rule;
 receiving said viewership data from said network service provider system;
 mapping said viewership data with said potential customer base to obtain said user database;
 processing and aggregating said user database to obtain said optimal user database; and
 broadcasting said advertisement through said network service provider system in said communications channel and at said optimal timestamp in accordance to at least one rule from said second set of rules.

9. The system of claim 7, wherein said network is a television network.

* * * * *